US012748501B2

(12) United States Patent
Martindale

(10) Patent No.: US 12,748,501 B2
(45) Date of Patent: Sep. 29, 2026

(54) KEYPAD CONTROLLER DEVICE

(71) Applicant: Kevin Martindale, Bemidji, MN (US)

(72) Inventor: Kevin Martindale, Bemidji, MN (US)

( * ) Notice: Subject to any disclaimer, the term of this patent is extended or adjusted under 35 U.S.C. 154(b) by 0 days.

(21) Appl. No.: 18/966,230

(22) Filed: Dec. 3, 2024

(65) Prior Publication Data

US 2025/0199625 A1 Jun. 19, 2025

Related U.S. Application Data

(60) Provisional application No. 63/610,051, filed on Dec. 14, 2023.

(51) Int. Cl.
*G06F 3/02* (2006.01)
*G06F 1/20* (2006.01)
*G06F 3/023* (2006.01)
*G06F 3/0354* (2013.01)

(52) U.S. Cl.
CPC .............. *G06F 3/0213* (2013.01); *G06F 1/20* (2013.01); *G06F 3/0205* (2013.01); *G06F 3/0231* (2013.01); *G06F 3/03543* (2013.01)

(58) Field of Classification Search
None
See application file for complete search history.

(56) References Cited

U.S. PATENT DOCUMENTS 5,790,769 A * 8/1998 Buxton ................. G06F 3/0338 345/475
5,949,401 A * 9/1999 Kazarian ............... G06F 3/0213 345/163
5,990,870 A * 11/1999 Chen ................... G06F 3/03543 345/161
8,054,292 B1 * 11/2011 Forde .................. G06F 3/03543 345/163
8,641,525 B2 2/2014 Burgess
10,022,623 B2 7/2018 Huffer
11,369,867 B2 6/2022 Huffer
2004/0061681 A1 * 4/2004 Shen ................... G06F 3/03543 345/163
2007/0256913 A1 11/2007 Wee
2012/0142420 A1 6/2012 Huffer
2012/0146915 A1 * 6/2012 Chen ..................... G06F 1/1635 345/169
2012/0271180 A1 * 10/2012 Ren ..................... G06F 3/03543 600/300

(Continued)

*Primary Examiner* — Aneeta Yodichkas
(74) *Attorney, Agent, or Firm* — Brennan, Manna & Diamond, LLC

(57) ABSTRACT

A multipurpose PC controller comprising an insulating, lightweight housing with a customizable layout, including a keypad integrated into the top surface is disclosed. A ground or base supporting member extends from the rear side at an angle to support the user's palm, while a knob and pinky or little finger support provide ergonomic handling and finger stability. The device includes a connector for external display or console connectivity and built-in RGB LED illumination within the keypad. The keypad configuration enables optimal finger access, and the ground or base supporting member can be adjusted to meet different user needs. The housing also includes a wireless transceiver for external device connectivity. The controller can be used as a keyboard (i.e., keypad) and as a mouse and can be customized to different applications.

13 Claims, 9 Drawing Sheets

(56) References Cited

U.S. PATENT DOCUMENTS

| | | | | |
|---|---|---|---|---|
| 2013/0176225 | A1* | 7/2013 | Chung | G06F 3/0219<br>345/168 |
| 2014/0375566 | A1* | 12/2014 | Tagge | G06F 3/021<br>345/168 |
| 2016/0327986 | A1* | 11/2016 | Farahani | G06F 1/169 |
| 2022/0391344 | A1* | 12/2022 | Aurongzeb | A63F 13/235 |

* cited by examiner

KEYPAD CONTROLLER DEVICE

CROSS-REFERENCE TO RELATED APPLICATION

The present application claims priority to, and the benefit of, U.S. Provisional Application No. 63/610,051, which was filed on Dec. 14, 2023, and is incorporated herein by reference in its entirety.

FIELD OF THE INVENTION

The present invention generally relates to the field of mouse controllers and keypad controllers. More specifically, the present invention relates to a novel personal computer (PC) controller having a keypad. The controller functions both as a mouse and a keypad while enabling comfortable, proper, and relaxing posture. Accordingly, the present disclosure makes specific reference thereto. Nonetheless, it is to be appreciated that aspects of the present invention are also equally applicable to other like applications, devices, and methods of manufacture.

BACKGROUND

By way of background, individuals generally participate in PC gaming and utilize their computer for other activities like spreadsheet tracking and data analysis, CAD work, etc. Such individuals commonly experience discomfort due to desktop only products like gaming mice, keyboards, controllers, and the like. Most of the desktop only devices are not portable and cannot be used by gamers who participate in LAN parties. A lot of time and effort is required to setup desktop mice, keyboards, or gaming controllers before starting with the game.

Further, PC gaming devices available in the market are usually platform-specific and cannot be used on multiple platforms which restricts their applications. Individuals must buy multiple gaming devices to use on different platforms, that becomes too expensive for the users. All the individuals may be unable to afford multiple gaming devices, thereby leaving them disappointed. Apart from the applicability concerns, the conventional gaming devices are not ergonomically designed and usually have poor hand positions that can result in cramps and developing ailments like carpal tunnel syndrome. With the cramps/ailments in hand, individuals may be unable to work on PC or play games anymore, until their ailment gets better. Also, individuals with limited physical dexterity may be unable to use standard gaming devices or desktop only products and may look for other comfortable devices to use for working on their PC's, Laptops or for playing games. Additionally, the existing gaming devices are designed while considering ease of use for right-handed users while the comfort of using each hand for different devices is not taken into consideration, thereby leaving them frustrated with the existing gaming devices.

Further, for using the existing gaming or desktop only devices, individuals must sit up straight and remain hunched over to comfortably use their mouse and keyboard. However, not all the individuals may be able to sit up straight in their chair for a long period of time and may end up leaving their work without completing it. The peripherals or accessories for the PC are not compact may occupy a significant desk space, thereby leaving minimal space for keeping other required items.

Therefore, there exists a long felt need in the art for a multipurpose controller that can be used for playing games or working a PC, while working on different platforms. There is also a long felt need in the art for a multipurpose controller that eliminates the need to buy different devices to work on different platforms and therefore provides an affordable controller option for the gamers/users. Additionally, there is a long felt need in the art for an ergonomically designed controller that can be easily used by individuals while avoiding cramps or ailments in their hands. Moreover, there is a long felt need in the art for a uniquely designed controller that can be used conveniently by all the users including individuals with limited physical dexterity. Further, there is a long felt need in the art for a controller device that is compact and enables the users to keep other necessary items on the desk as well. Furthermore, there is a long felt need in the art for a controller device that is portable and can be easily installed for quick use by gamers. Finally, there is a long felt need in the art for a uniquely designed multi-functional controller that can consider the comfort of dual-handed users (i.e., one hand for a mouse and one hand for a controller) and enables the users to maintain comfortable posture for longer periods of time.

The subject matter disclosed and claimed herein, in one embodiment thereof, comprises a combined mouse and keypad controller. The controller functions both as a mouse and a keypad and comprises a housing having a top surface, a bottom surface, a rear side, a pair of opposite sides, and a front end. A ground or base supporting member extends downwardly and adjustably at an angle from the rear side of the housing for supporting the palm of a user and a plurality of apertures are disposed on the rear side for heat dissipation and illumination. A cavity in the top surface is adapted for receiving and accommodating a keypad and a connector on the front end of the housing connects the gaming controller to external devices. A knob is disposed on the intersection of the rear side and one of the sides of the housing for providing enhanced grip and accessing a joystick. The joystick is disposed on one of the sidewalls and can be easily operated (i.e., actuated) by a thumb and at least one finger is positioned on the keypad for operating thereon.

In this manner, the combined mouse and keypad controller of the present invention accomplishes all of the forgoing objectives and provides users with a novel controller that provides an ergonomic grip and reduce strain on the wrist and fingers during extended use. The controller is suitable for a variety of applications including PC gaming, video editing, CAD work, and more, serving as a combined keyboard and mouse. The integrated keypad is designed for optimal finger access, enabling for efficient operation with minimal movement. The ground or base supporting member is adjustable in elevation, enabling users to modify the angle to provide better support for their wrist, palm, and fingers. The controller can be used conveniently by all the users including individuals with limited physical dexterity.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose gaming controller. The controller functions both as a mouse and a keypad and comprises an insulating and lightweight housing having a top surface, a bottom surface, a rear side, a pair of opposite sides, and a front end. A ground or base supporting member extends downwardly from the rear side of the housing and a plurality of apertures are disposed on the rear side for heat dissipation and illumination. A cavity in the top surface is adapted for receiving and accommodating a keypad and a connector on the front end of the housing connects the gaming controller to external devices. A knob is disposed on the intersection of the rear side and one of the sides of the housing for providing enhanced grip and for accessing a joystick.

In yet another embodiment, a multipurpose gaming controller is disclosed. The controller comprises a housing having a top surface, a bottom surface, a rear side, and a pair of opposite sides, a cavity in the top surface for receiving and accommodating a keypad, a keypad is disposed within the cavity, a knob is disposed on the intersection of the rear side and one of the opposite sides, a pinky or little finger support is disposed on the intersection of the rear side and the other opposite side, non-slipping surface tabs are disposed on the front ends of both opposite sides, wherein the keypad includes built-in illumination and the knob, pinky or little finger support, and keypad are positioned to enhance ergonomic handling of the gaming controller.

In another embodiment, a multipurpose gaming controller providing ergonomic benefits is disclosed. The controller includes an insulating and lightweight housing with a top surface, bottom surface, rear side, and a pair of opposite sides. A ground or base supporting member extends downwardly from the rear side to support the user's palm. A keypad is integrated into a cavity on the top surface for optimizing finger access. A knob is positioned at the intersection of the rear side and one side to fit between the palm and thumb. The controller supports ergonomic usage, reducing strain on the user's wrist and fingers during extended use.

In another aspect, the ground or base supporting member is adjustable in elevation using a hinge to adapt to different user requirements.

In yet another aspect, the keypad is a 6×5, 5×4, 4×3, 3×2, or 2×1 inch (i.e., width and height) configuration enabling access for three fingers (index, middle, and ring) to operate (i.e., actuate) the buttons.

In yet another embodiment, the housing includes a wireless transceiver for connecting with Bluetooth or other WIFI capability to an external gaming console or device and the keypad includes built-in RGB LEDs that can flash or illuminate continuously based on user preferences.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
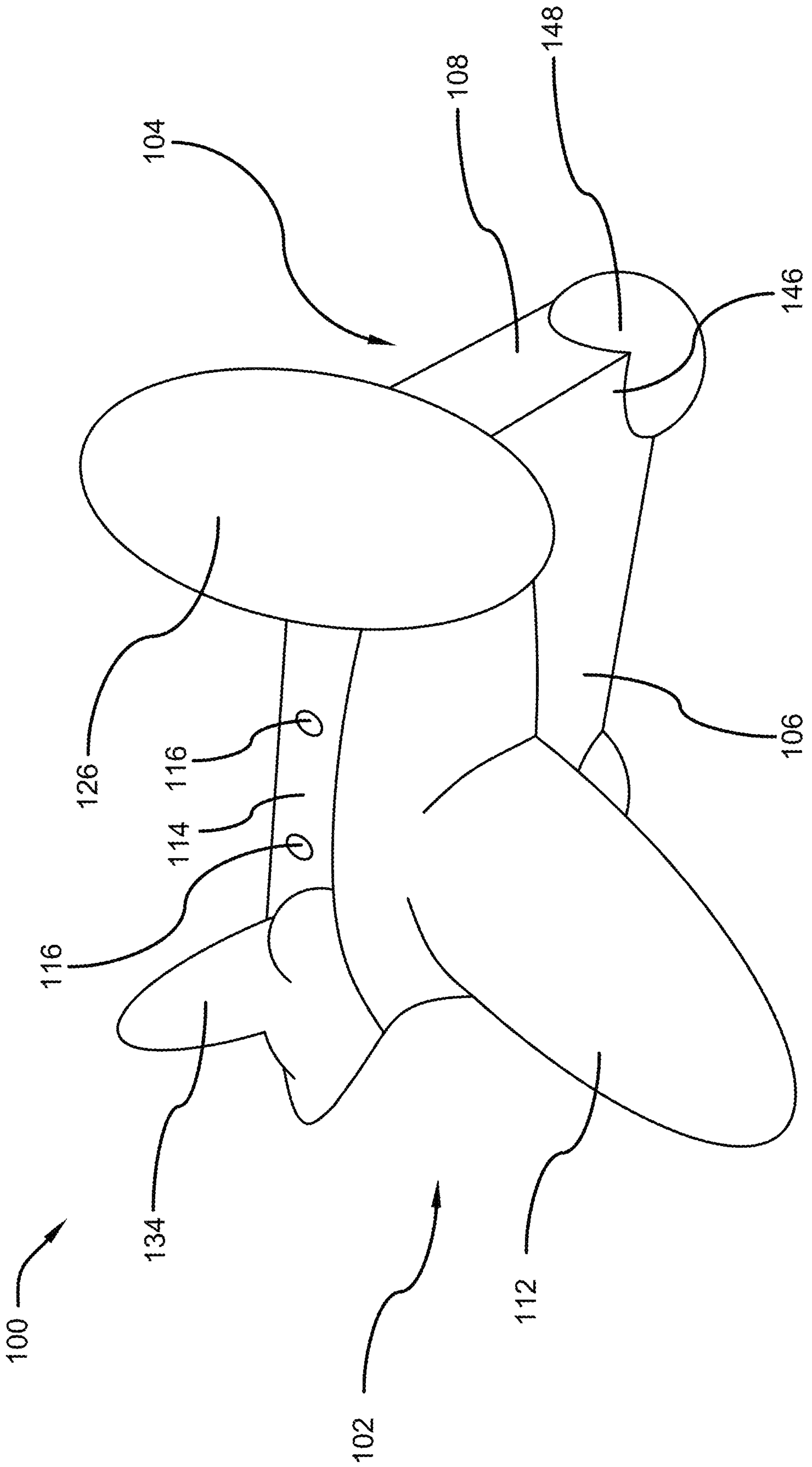
FIG. 1 illustrates a perspective view of one potential embodiment of the multipurpose gaming controller of the present invention in accordance with the disclosed structure.
Figure 2:
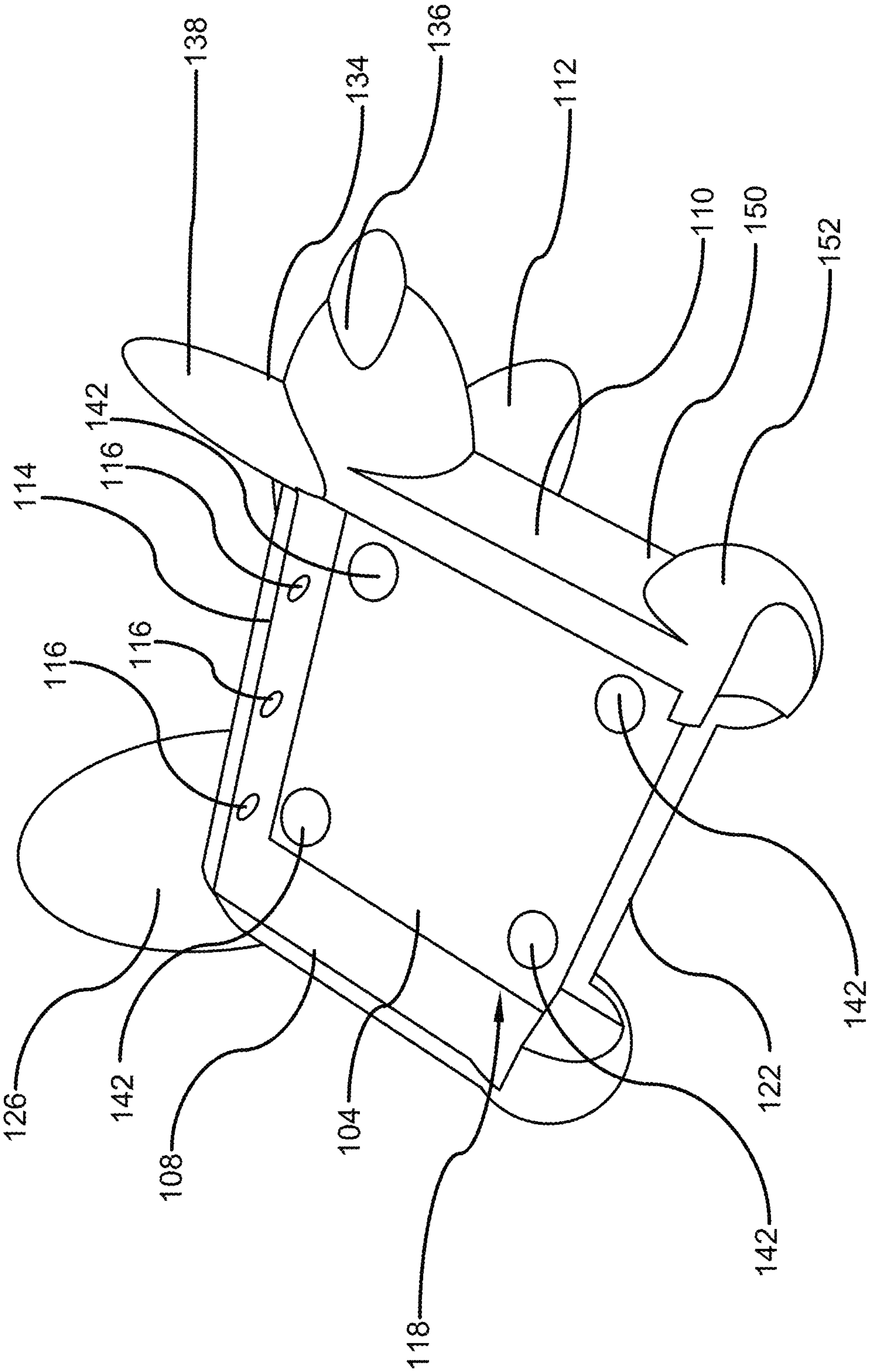
FIG. 2 illustrates a top perspective view of the multipurpose gaming controller of FIG. 1 of the present invention in accordance with the disclosed structure.
Figure 3:
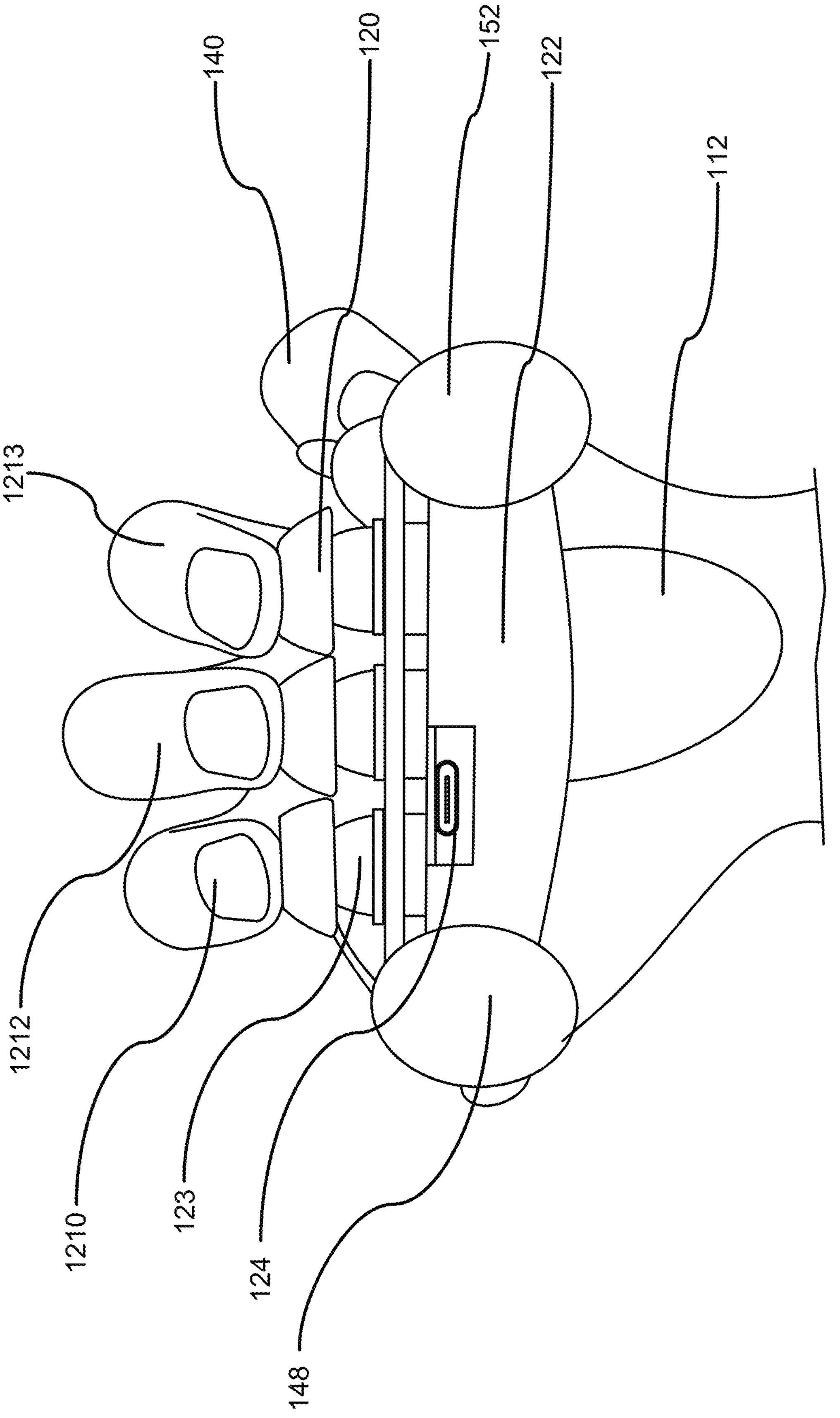
FIG. 3 illustrates a front perspective view of the multipurpose gaming controller of FIG. 1 of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a exists a long felt need in the art for a multipurpose controller that can be used for playing games or working PC, while working on different platforms. There is also a long felt need in the art for a multipurpose controller that eliminates the need to buy different devices to work on different platforms and therefore provides an affordable controller option for the gamers/users. Additionally, there is a long felt need in the art for an ergonomically designed controller that can be easily used by individuals without getting any cramps or ailments in their hands. Moreover, there is a long felt need in the art for a uniquely designed controller that can be used conveniently by all the users including individuals with limited physical dexterity. Further, there is a long felt need in the art for a controller device that is compact and enables the users to keep other necessary items on the desk as well. Furthermore, there is a long felt need in the art for a controller device that is portable and can be easily installed for quick use by gainers. Finally, there is a long felt need in the art for a uniquely designed multifunctional controller that can consider the comfort of dual-handed users (i.e., one hand for a mouse and one hand for a controller) and enables the users to maintain comfortable posture for longer periods of time.

The present invention, in one exemplary embodiment, is a multipurpose gaming controller providing ergonomic benefits. The controller includes an insulating and lightweight housing with a top surface, bottom surface, rear side, and a pair of opposite sides. A ground or base supporting member extends downwardly from the rear side to support the user's palm. A keypad is integrated into a cavity on the top surface for optimized finger access. A knob is positioned at the intersection of the rear side and one side to fit between the palm and thumb. The controller supports ergonomic usage, reducing strain on the user's wrist and fingers during extended use.

In different embodiments, the term "game controller" or "gaming controller" may interchangeably be referred to as gaming device, gamepad, video game controller, game controller unit, controller, controller unit, gaming console, gaming console unit, or gaming input device.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of multipurpose gaming controller of the present invention in accordance with one embodiment of the disclosed structure. The multipurpose gaming controller 100 is designed as an improved gaming controller for PC gaming, editing videos, CAD work, and more and can function as combined keyboard and mouse. The combined keyboard and mouse device 100 can be customized to meet the requirements of different users. More specifically, the gaming controller 100 includes an insulating and lightweight housing 102 having a top surface 104, a bottom surface 106 and a pair of opposite sides 108, 110. In the preferred embodiment, the multipurpose gaming controller 100 is designed for the non-mouse hand to operate (i.e., actuate) the controller and maintain optimal inputs for their programs. It is to be appreciated that the gaming controller 100 can be used with one hand while a mouse is used with the other hand. Thus, the gaming controller 100 and a mouse can be used in conjunction with each other (i.e., simultaneously).

Referring to FIGS. 1-4, a ground or base supporting member 112 extends downwardly from the rear side or rear panel 114 of the housing 102 in a direction indicated by arrow A. The ground or base supporting member 112 also helps in supporting palm of a user when operating the gaming controller 100. The rear side or rear panel 114 has a plurality of apertures 116 for helping heat dissipation and enabling the embedded illumination to come out from the apertures 116. The top panel or top surface 104 includes a cavity 118 for receiving and accommodating a keypad 120. The keypad 120 can be integrated or can also be removably attached to the housing 102.

Figure 7:
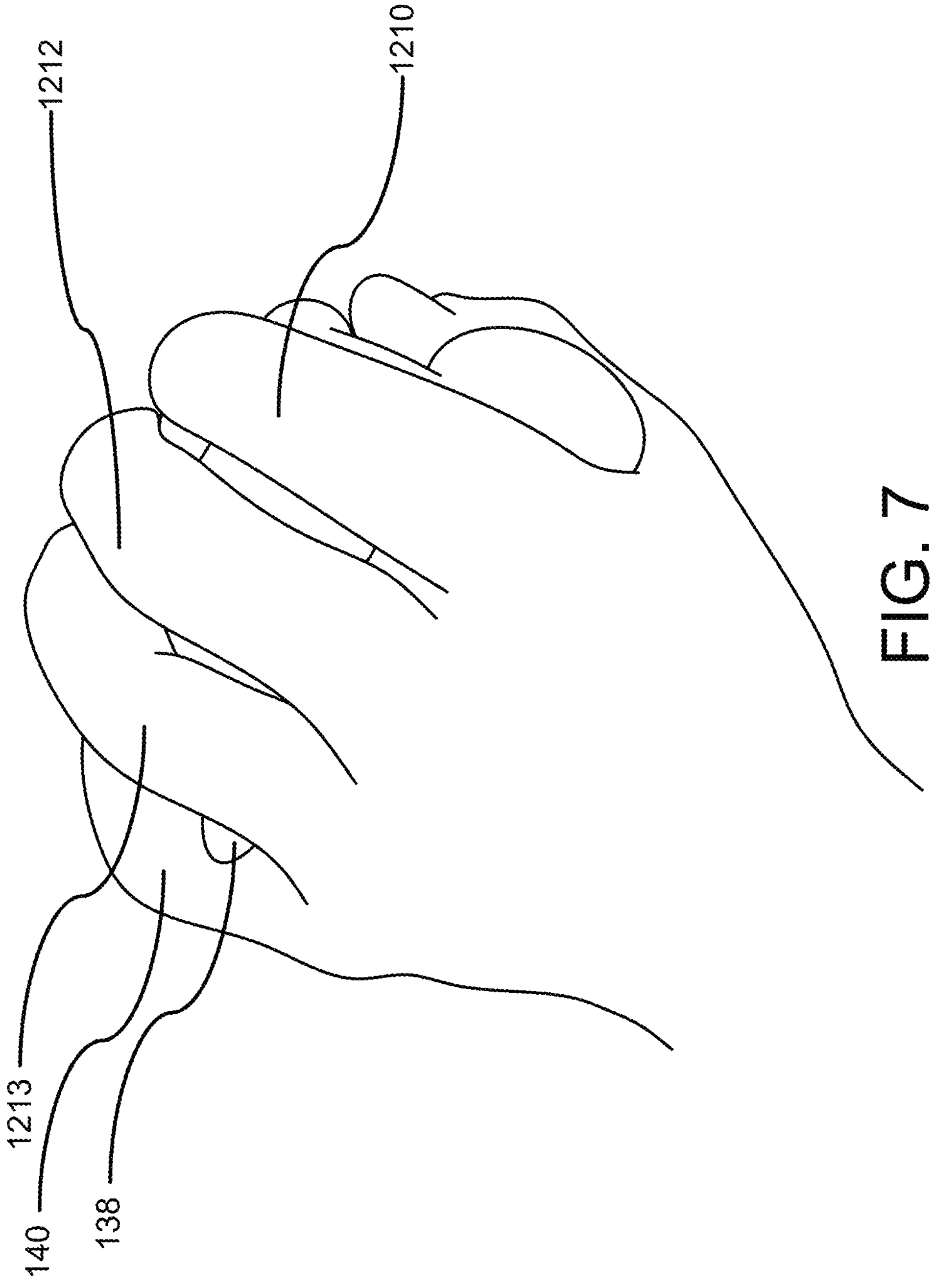
FIG. 7 illustrates a top perspective view of the user holding the multipurpose gaming controller of FIG. 1 of the present invention in accordance with the disclosed structure.
Figure 8:
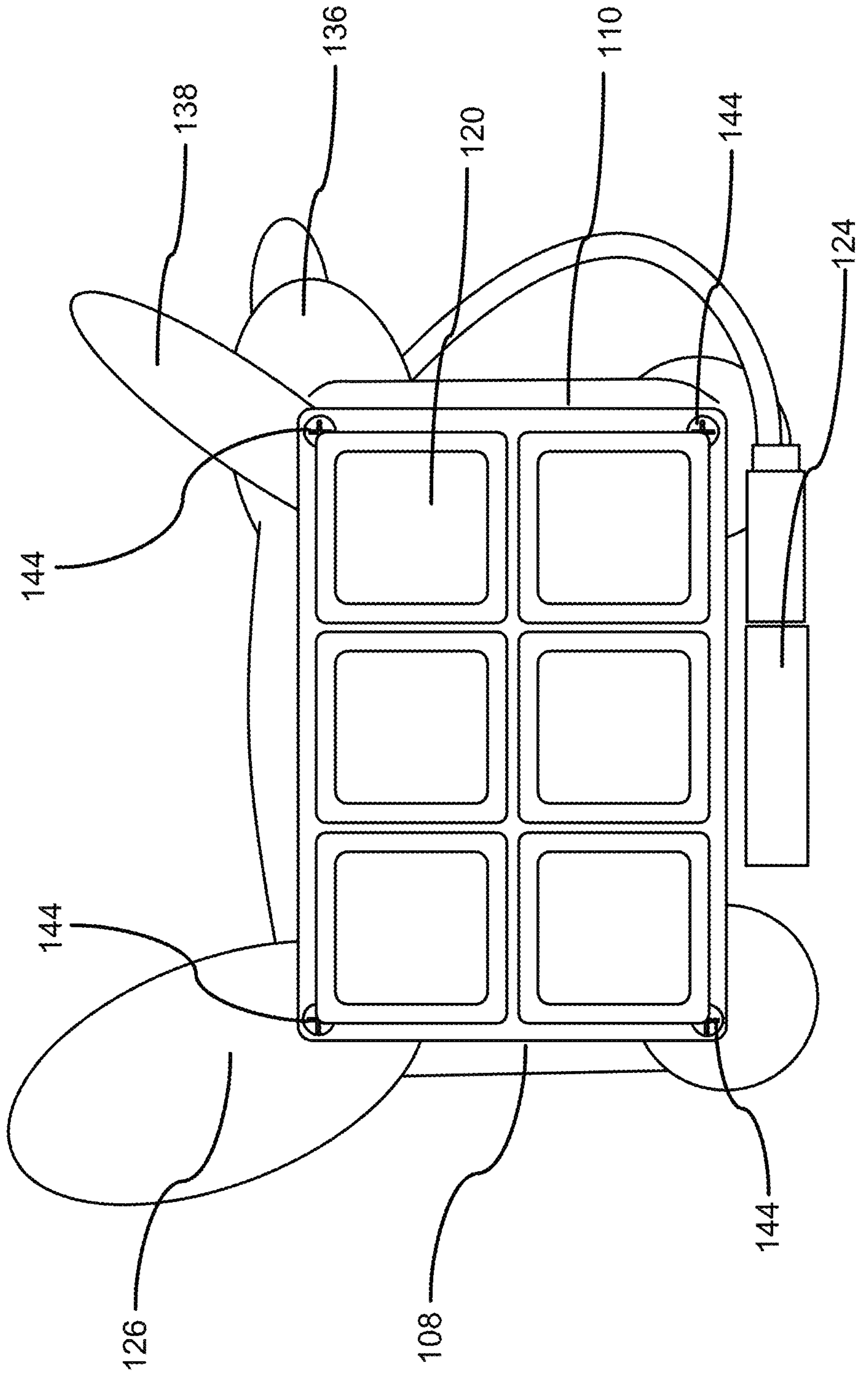
FIG. 8 illustrates a top perspective view of the multipurpose gaming controller of FIG. 1 of the present invention in accordance with the disclosed structure.

In the preferred embodiment, a 6×5, 5×4, 4×3, 3×2, or 2×1 inch (i.e., width and height) keyboard or keypad 120 is placed in the cavity 118 and enabling three fingers of a single hand (index finger 1210, middle finger 1212 and ring finger 1213) as illustrated in FIG. 7 to access the buttons of the keyboard or keypad 120 for operating the gaming controller 100. The front end or front side 122 of the housing 102 includes a connector 124 which can be a USB connector, USB-C, HDMI, or any other connector for connecting the gaming controller 100 to a display device or any other console. The gaming controller 100 can include wireless connection capability via Bluetooth or other WIFI capability.

Figure 5:
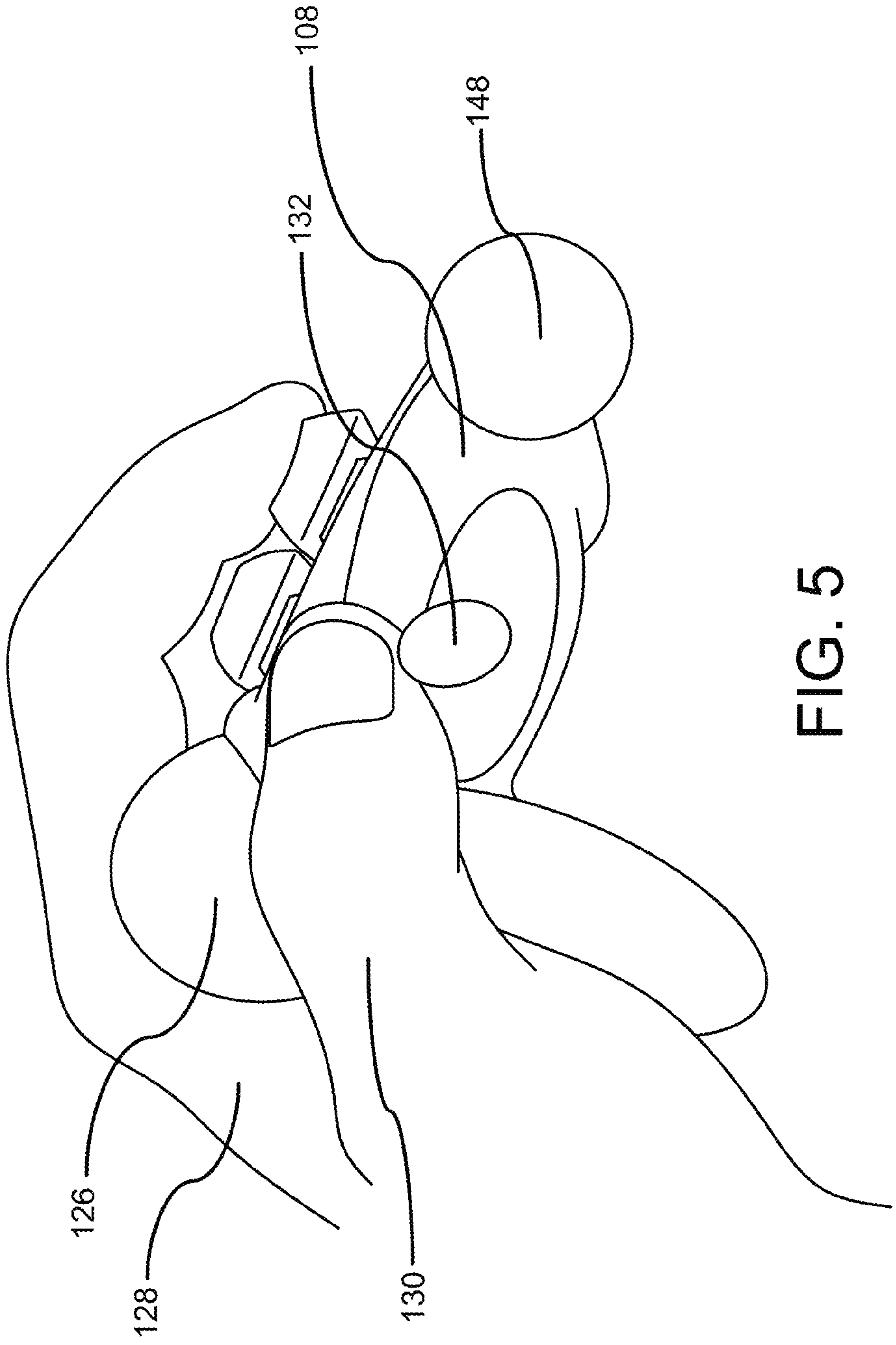
FIG. 5 illustrates another side perspective view of the multipurpose gaming controller of FIG. 1 of the present invention in accordance with the disclosed structure.

A knob 126 is disposed on the intersection of the rear side or rear panel 114 and the side 108. In use and as illustrated in FIG. 5, the knob 126 protrudes between the palm 128 and the thumb 130 of an operating user for providing an efficient and ergonomic way to handle the game controller device 100. The thumb 130 rests on the side 108 and can operate (i.e., actuate) any joystick or lever 132 disposed on the side 108 of the housing 102. The fingers rest on the keyboard or keypad 120 and the palm is supported by the ground or base supporting member 112.

Figure 6:
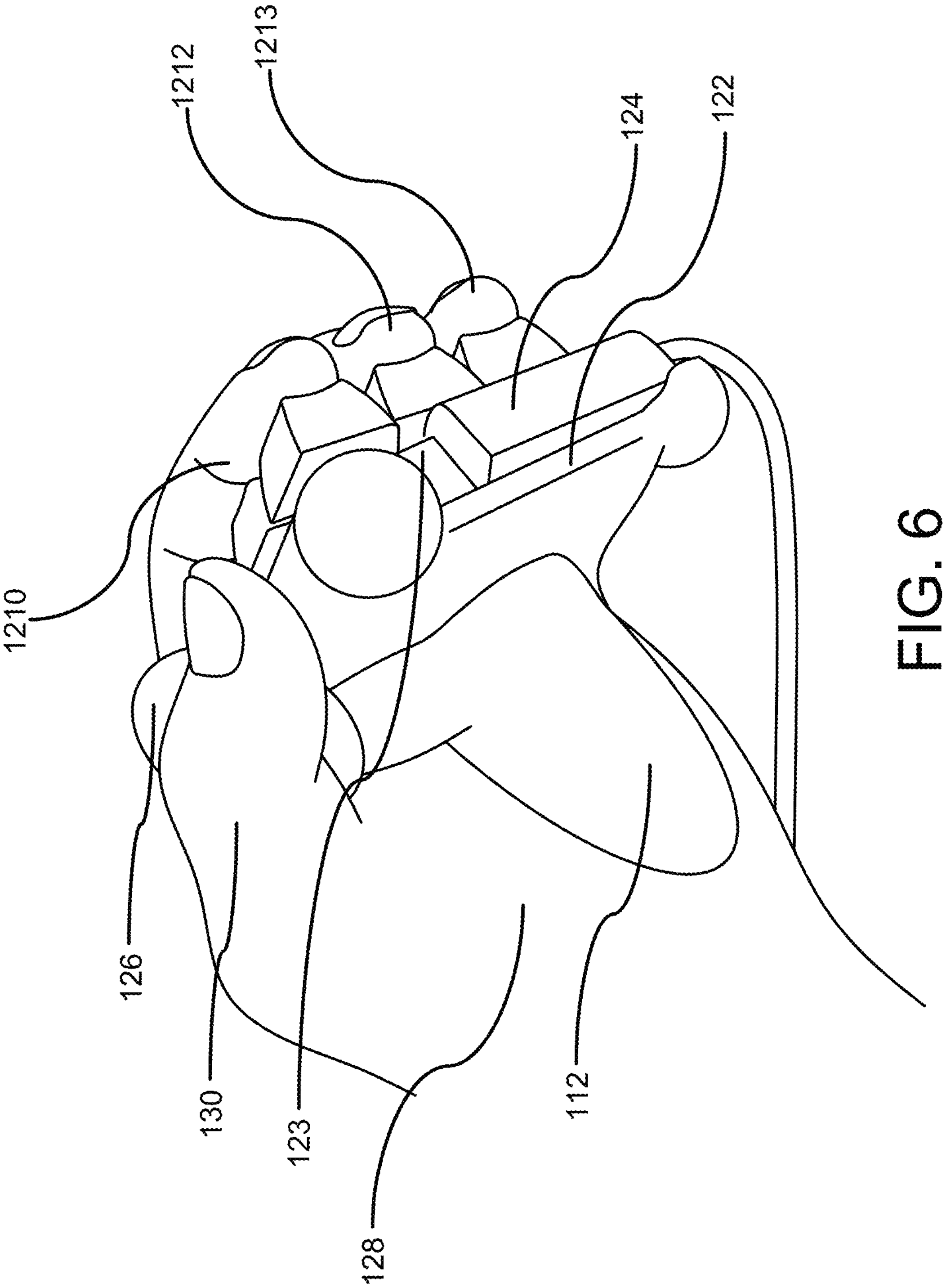
FIG. 6 illustrates a side perspective view of a user holding the multipurpose gaming controller of FIG. 1 of the present invention in accordance with the disclosed structure.

A pinky or little finger support 134 is disposed on intersection of the rear surface 114 and the other side 110. The pinky or little finger support 134 protrudes away from the rear surface 114 and includes two transversal members 136, 138. In use and as illustrated in FIG. 6, the pinky or little finger 140 rests on farther side from the palm. For permanently or removably securing the keyboard or keypad 120 to the top surface 104, a plurality of apertures 142 are disposed in the top panel or top surface 104. The plurality of apertures 142 are adapted to receive corresponding fasteners 144 for securing the keyboard or keypad 120 to the housing 102.

Figure 4:
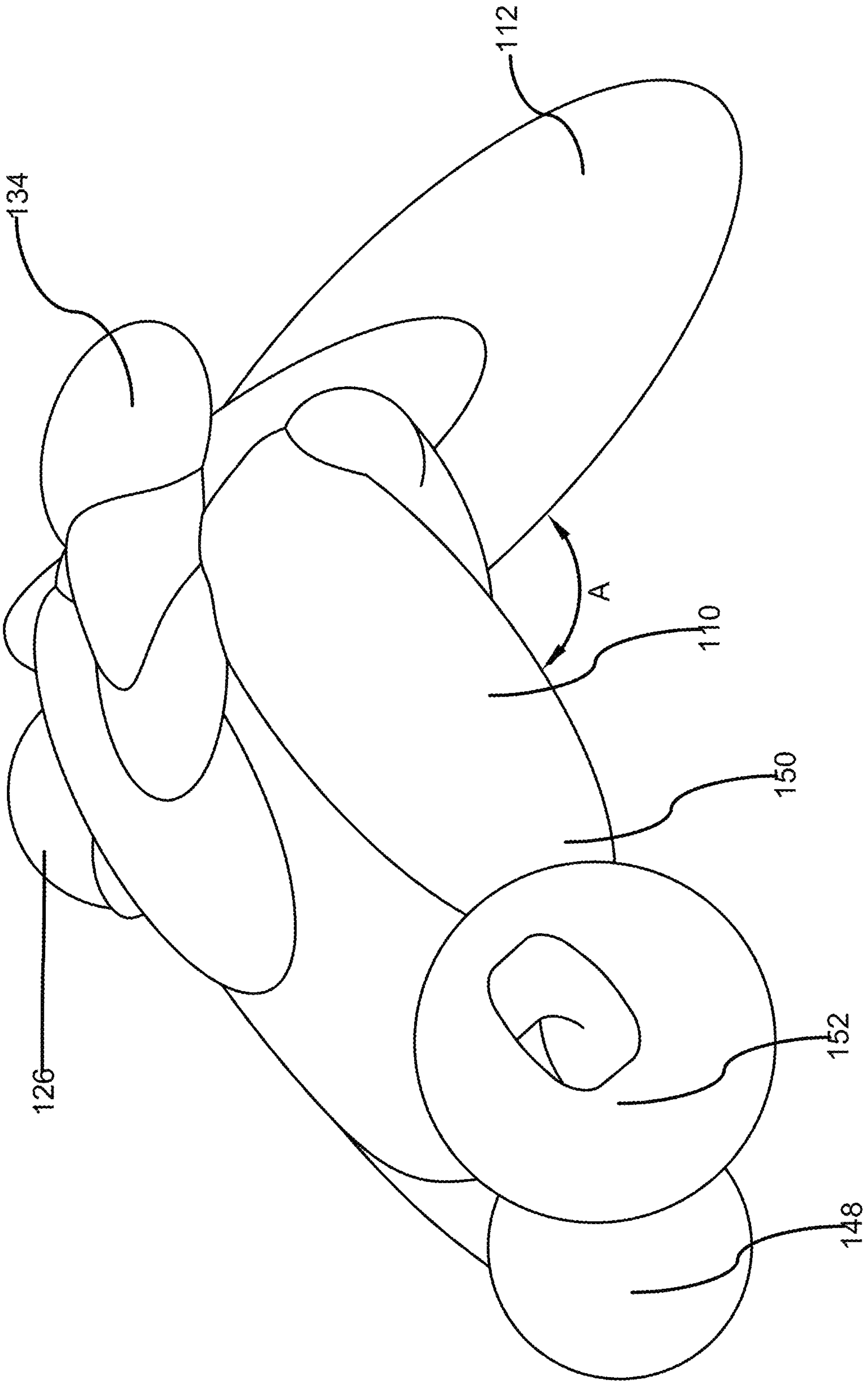
FIG. 4 illustrates a side perspective view of the multipurpose gaming controller of FIG. 1 of the present invention in accordance with the disclosed structure.

The front end 146 of the first side 108 has a non-slipping surface tab 148 and the front end 150 of the second side 110 also has a corresponding non-slipping surface tab 152. The non-slipping surface tabs 148, 152 provide stability to the gaming controller 100 when kept on a surface such as a table for use and operation. Referring to FIGS. 1, 4, and 5, the keyboard or keypad 120 and the top panel or top surface 104 extend laterally downwards from the rear end 114 and the ground or base supporting member 112 supports the device 100 on the surface. Preferably, the ground or base supporting member 112 is at an angle that ranges from 90 degrees to about 140 degrees for providing support to wrist, palm, and fingers of an operating user.

The keyboard or keypad 120 includes built-in RGB or any other multipurpose LED or illumination 123. The LEDs can flash or illuminate continuously as per the preferences of a user. In some embodiments, the controller device 100 can include a wireless transceiver for connecting (i.e., via Bluetooth or WIFI) to a gaming console or any other external device. The device 100 is modular and position of knob 126, ground or base supporting member 112, and joystick can be customized or adjusted.

Figure 9:
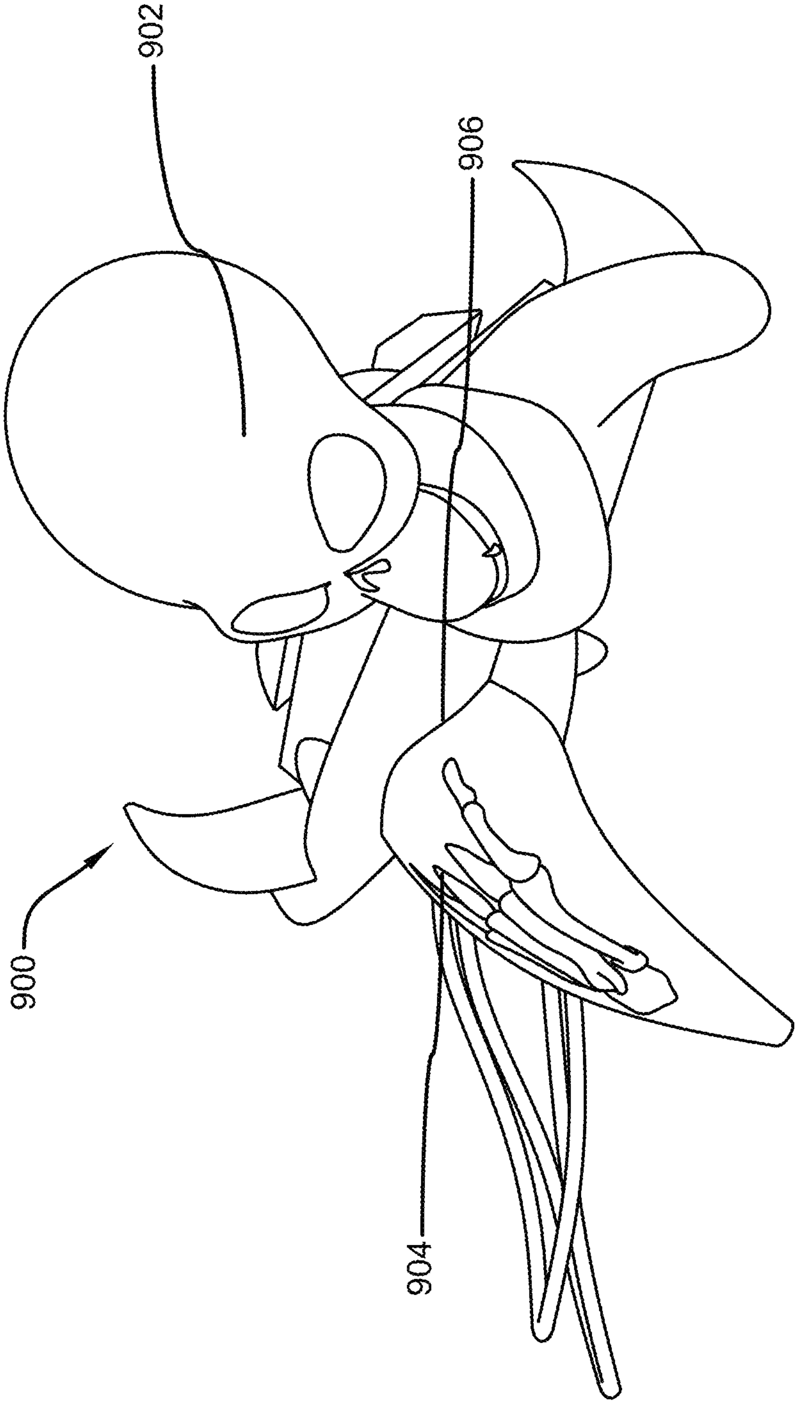
FIG. 9 illustrates a perspective view of another potential embodiment of the multipurpose gaming controller of the present invention in accordance with the disclosed structure.

FIG. 9 illustrates a perspective view of another embodiment of the combined mouse and keyboard (i.e., keypad) device of the present invention in accordance with the disclosed structure. In the present embodiment, the device 900 includes a customized knob 902 in the form of a skull. The supporting member 904 can also be customized and in the present embodiment is adjustable using a hinge 906 for adjusting elevation of the supporting member 904 and to adapt to requirements of different users.

The gaming controller devices 100, 900 enable users to maintain a much more comfortable posture for longer periods of time while still having complete access to the controller device 100. The hot-swappable key feature enables users to choose key layouts for different programs. The controller offers a more convenient and efficient replacement for left-handed keyboard and mouse options when gaming or using a computer.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "gaming controller device", "combined keyboard and mouse device", "multipurpose gaming controller", and "controller device" are interchangeable and refer to the multipurpose gaming controller 100, 900 of the present invention.

Notwithstanding the forgoing, the multipurpose gaming controller 100, 900 of the present invention can be of any suitable size and configuration as is known in the art without affecting the overall concept of the invention, provided that it accomplishes the above stated objectives. One of ordinary skill in the art will appreciate that the multipurpose gaming controller 100, 900 as shown in the FIGS. are for illustrative purposes only, and that many other sizes and shapes of the multipurpose gaming controller 100, 900 are well within the scope of the present disclosure. Although the dimensions of the multipurpose gaming controller 100, 900 are important design parameters for user convenience, the multipurpose gaming controller 100, 900 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combined keypad device comprising:

a single handed multipurpose controller;

a housing having a top panel, a bottom surface, a pair of opposing sides, a front side, and a rear panel;

a keypad; and a base supporting member;

wherein said base supporting member extending downwardly from said rear panel of said housing;

wherein said base supporting member is a palm support of a user when operating said single handed multipurpose controller;

wherein said top panel having a cavity for selectively attaching said keypad;

wherein said keypad when placed in said cavity accessible by three fingers of a single hand of the user;

wherein said three fingers are an index finger, a middle finger, and a ring finger;

wherein a knob is disposed on an intersection of said rear panel and one of said pair of opposing sides and is configured to protrude between a palm and a thumb of the user so that the thumb rests on the respective opposing side and the three fingers rest on the keypad with the palm supported by the base supporting member; and further wherein a little finger support is disposed on an intersection of said rear panel and one of said pair of opposing sides opposite the knob extending away from said rear panel and comprises a pair of transversal members for receiving a little finger therebetween.

2. The combined keypad device of claim 1, wherein said keypad having a width from 2 inches to 6 inches, and a height from 1 inch to 5 inches.

3. The combined keypad device of claim 1, wherein said apertures having illumination.

4. The combined keypad device of claim 1, wherein said keypad having a width from 3 inches to 5 inches, and a height from 2 inch to 4 inches.

5. The combined keypad device of claim 1, wherein said connector port selectively connectable to another device selected from the group consisting of a display device and a console device.

6. The combined keypad device of claim 1 further comprising a joystick, wherein said joystick disposed on said one of said pair of opposing sides for actuation by the thumb of the user.

7. A keypad device comprising:

a single handed multipurpose controller;

a housing having a top panel, a bottom surface, a pair of opposing sides, a front side, and a rear panel;

a keypad;

a knob;

a joystick; and a base supporting member;

wherein said base supporting member extending downwardly from said rear panel of said housing;

wherein said base supporting member is a palm support of a user when operating said single handed multipurpose controller;

wherein said top panel having a cavity for selectively attaching said keypad;

wherein said keypad when placed in said cavity accessible by three fingers of a single hand of the user;

wherein said three fingers are an index finger, a middle finger, and a ring finger;

wherein said joystick disposed on said one of said pair of opposing sides for actuation by the thumb of the user;

wherein the rear panel comprises a plurality of heat dissipation apertures;

wherein the front side comprises a USB-C connector port;

wherein said knob is disposed on an intersection of said rear panel and one of said pair of opposing sides and is configured to protrude between a palm and a thumb of the user so that the thumb rests on the respective opposing side and the three fingers rest on the keypad with the palm supported by the base supporting member; and further wherein a little finger support is disposed on an intersection of said rear panel and one of said pair of opposing sides opposite the knob extending away from said rear panel and comprises a pair of transversal members for receiving a little finger therebetween.

8. An electronic keypad device comprising:

a single handed multipurpose controller;

a housing having a top panel, a bottom surface, a pair of opposing sides, a front side, and a rear panel;

a keypad comprising a plurality of keypad fasteners; and an adjustable base supporting member;

wherein said adjustable base supporting member extending downwardly from said rear panel of said housing;

wherein said adjustable base supporting member is a palm support of a user when operating said single handed multipurpose controller;

wherein said top panel having a cavity for selectively attaching said keypad;

wherein said keypad when placed in said cavity accessible by three fingers of a single hand of the user;

wherein said three fingers are an index finger, a middle finger, and a ring finger;

wherein said adjustable base supporting member having a hinge for adjusting a height of said adjustable base supporting member;

wherein the top surface of the housing comprises a plurality of apertures adapted to receive the keypad fasteners to secure the keypad to the housing;

wherein said adjustable base supporting member extends at an angle from between 90 degrees to 140 degrees relative to said bottom surface;

wherein said adjustable base supporting member comprises a hinge configured to adjust an elevation of said adjustable base supporting member; and further wherein said front side comprises an HDMI port.

9. The electronic keypad device of claim 8, wherein said keypad having a width from 2 inches to 6 inches, and a height from 1 inch to 5 inches.

10. The electronic keypad device of claim 8, wherein said keypad having a width from 3 inches to 5 inches, and a height from 2 inch to 4 inches.

11. The electronic keypad device of claim 8, wherein said pair of opposing sides having a first front end including a first non-slipping surface tab and a second front end including a second non-slipping surface tab.

12. The electronic keypad device of claim 8 further comprising a knob, wherein said knob disposed between said rear panel and one of said pair of opposing sides for securing between a thumb, the index finger, and a palm of the user.

13. The electronic keypad device of claim 12 further comprising a joystick, wherein said joystick disposed on said one of said pair of opposing sides for actuation by the thumb of the user.

* * * * *